United States Patent [19]

Dunmire

[11] 3,930,617

[45] Jan. 6, 1976

[54] IMPACT SPRINKLER

[75] Inventor: Charles William Dunmire, Fresno, Calif.

[73] Assignee: Johns-Manville Corporation, Denver, Colo.

[22] Filed: Nov. 25, 1974

[21] Appl. No.: 526,766

[52] U.S. Cl. ............ 239/230; 239/233; 308/237 A; 308/240

[51] Int. Cl.$^2$ ... B05B 3/04; B05B 3/16; F16C 33/20

[58] Field of Search ........... 239/230, 233, 500, 499; 308/237 A, 240

[56] References Cited

UNITED STATES PATENTS

| | | | |
|---|---|---|---|
| 1,236,511 | 8/1917 | Waring | 308/240 |
| 2,153,397 | 4/1939 | Sandler | 308/240 |
| 2,314,702 | 3/1943 | Higgins | 239/233 |
| 2,625,411 | 1/1953 | Unger | 239/233 X |
| 2,878,062 | 3/1959 | Crow | 239/230 X |
| 3,009,650 | 11/1961 | Alvarez | 239/230 |
| 3,315,897 | 4/1967 | Stout | 239/230 |
| 3,434,665 | 3/1969 | Royer | 239/230 |
| 3,664,586 | 5/1972 | Harris | 239/233 |
| 3,726,479 | 4/1973 | Leissner et al. | 239/233 |

FOREIGN PATENTS OR APPLICATIONS

| | | | |
|---|---|---|---|
| 334,087 | 8/1930 | United Kingdom | 308/237 A |

*Primary Examiner*—Robert S. Ward, Jr.
*Attorney, Agent, or Firm*—Robert M. Krone; Stephen C. Shear

[57] ABSTRACT

An impact sprinkler having several specific features is disclosed herein. One such feature resides in the use of a plastic water deflector having a number of cooperating water deflecting surfaces which improve the overall water distribution pattern of the sprinkler, specifically at the outlying areas of the pattern. Another feature of the sprinkler disclosed herein resides in the particular configuration provided for allowing the water deflector to pibot vack and forth. Regarding this second feature, the sprinkler disclosed herein typically includes a journal pin about which the water deflector can pivot. Located between this pin and the water deflector is at least one longitudinally extending slotted passage open at opposite ends. This passage provides a path through which abrasive material can escape should such material get lodged between the pin and deflector.

6 Claims, 5 Drawing Figures

Fig.1.
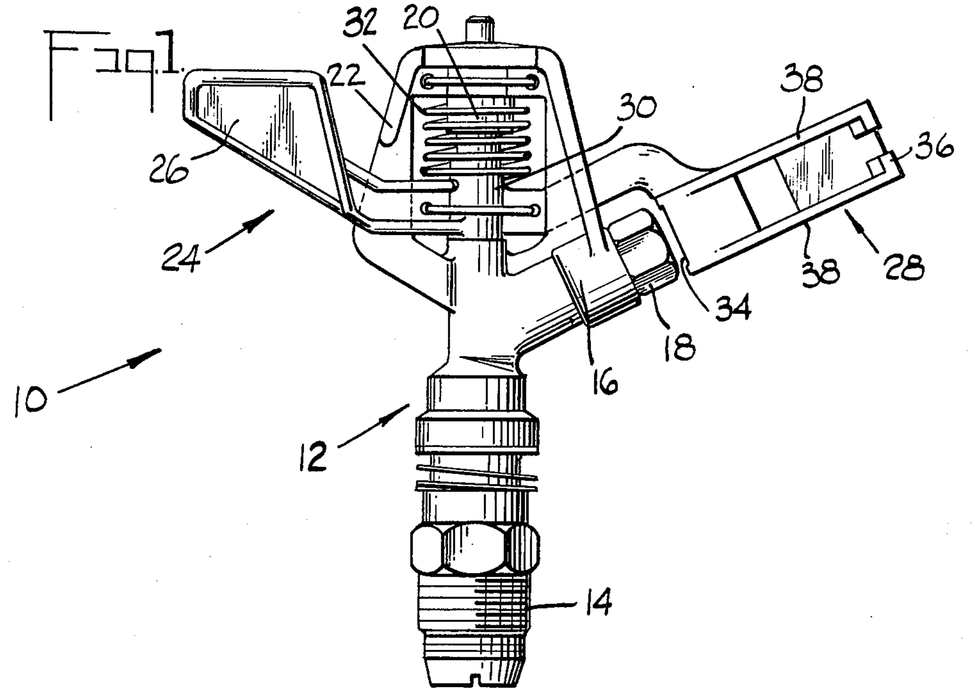
Fig.2.
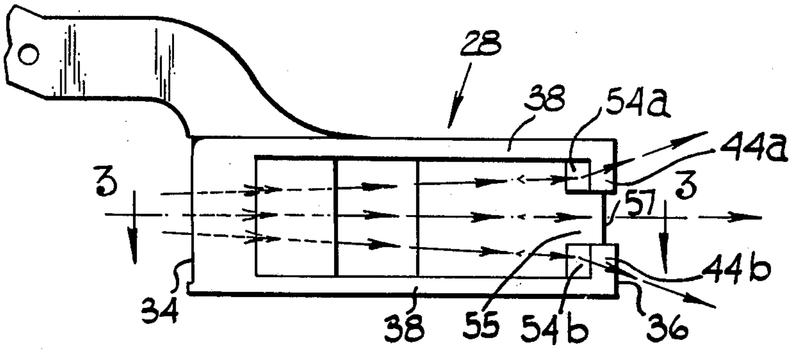
Fig.4.
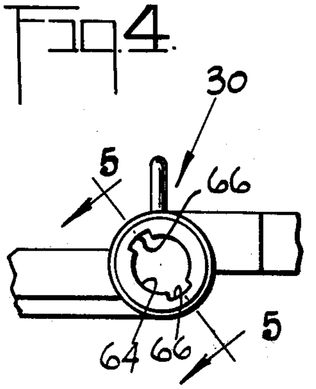
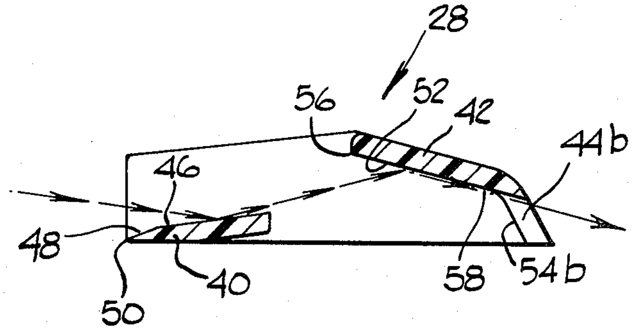
Fig.3.
Fig.5.
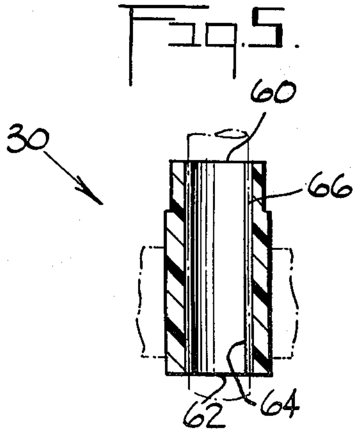

IMPACT SPRINKLER

BACKGROUND OF THE INVENTION

The present invention relates generally to sprinklers and more particularly to an impact sprinkler having several improved features.

Impact sprinklers are well known in the art. A typical impact sprinkler includes a main body, usually mounted for rotation, having a nozzle and a journal pin about which a water deflector is pivotally mounted. The water deflector is generally made up of three segments, i.e., opposite end segments, one of which is commonly referred to as a water deflecting segment or deflector spoon and the other of which is commonly referred to as a counterbalance arm, and a central segment which is disposed around the journal pin. This central segment, referred to as a bearing segment, supports the end segments for pivotal movement such that the deflector spoon moves into and out of a jet of water issuing from the sprinkler nozzle.

Heretofore, most water deflectors were constructed of brass. A typical brass deflector having a conventionally designed water deflector spoon provides a specific and satisfactory water distribution pattern around the sprinkler, in the outlying areas of the pattern as well as close in. More recently, because of cost and availability, many sprinkler manufacturers have been replacing their brass deflectors with more economical plastic deflectors, maintaining substantially the same design, especially with respect to the deflector spoon.

Applicant has discovered that, as a result of this change in material from brass to plastic, the water distribution pattern of the sprinkler changed significantly, even though the deflector design remained substantially the same. More specifically, applicant discovered that the substantial reduction in weight in converting over from a brass deflector to a plastic deflector produced a significant increase in what is commonly referred to as deflector rate of impact, i.e., the number of times the deflector spoon moves into and out of the water jet per given unit of time. This means that more water is being deflected by plastic deflectors than brass deflectors causing a significant reduction in the amount of water reaching the outlying areas of the water distribution pattern, or stated conversely, a significant increase of water is directed to areas close to the sprinkler. In this regard, as a general rule, water which reaches the outlying area of the pattern is the water which is undeflected or which is only slightly deflected. As will be seen hereafter, one feature of the present invention resides in an uncomplicated and economical change in the design of the plastic deflector spoon so as to significantly improve the water distribution pattern, specifically at the outlying areas of the pattern.

Another feature of the present invention resides in the bearing segment of the water deflector. More specifically, one drawback in heretofore provided deflectors pivotally mounted around a journal pin is that if abrasive material lodges between the journal pin and the deflector, specifically the bearing surface of the deflector surrounding the pin, thus foreign material can possibly cause increased wear of the components and/or possibly prevent the deflector from pivoting. While this drawback is not limited to plastic deflectors, the conversion to plastic deflectors certainly magnifies the drawback, especially from the standpoint of wear. As will be seen hereinafter, a second feature of the invention resides in an uncomplicated and economical modification of the deflector to minimize the possibility of abrasive materials or other debris permanently lodging between the journal pin and bearing surface of the deflector, possibly resulting in undue wear and/or damage generally.

SUMMARY OF THE INVENTION

An object of the present invention is to provide an impact sprinkler having a plastic water deflector and an improved water distribution pattern, specifically at the outlying areas of the pattern.

Another object of the present invention is to provide the just mentioned improved water distribution pattern in an uncomplicated and economical fashion.

Still another object of the present invention is to provide an impact sprinkler having a plastic water deflector which deflects a satisfactory amount of water into the outlying areas of the overall water distribution pattern attributed to the sprinkler.

A further object of the present invention is to provide an impact sprinkler which has been improved to minimize the possibility of abrasive material permanently lodging between its journal pin and deflector which is mounted for pivotal movement about the journal pin.

An impact sprinkler is disclosed herein and comprises a main body including a nozzle and a cylindrical water deflector support pin around which a water deflector is pivotally mounted. In accordance with one feature of the present invention, the water deflector is constructed of plastic and includes a water deflecting segment movable into and out of a jet of water issuing from the nozzle as the deflector pivots about the support pin. The water deflecting segment includes a first substantially flat water deflecting surface which extends away from the nozzle and which includes (1) opposite ends, one end of which is further from the nozzle than the other end and (2) opposite sides extending between the opposite ends. The water deflecting segment also includes a pair of second water deflecting surfaces extending out from and joining the further end of the first surface. These second surfaces extend towards each other from opposite sides of the first surface but are spaced from one another so as to define a slot therebetween, the slot being centrally located between the sides of the first surface. In this manner, some of the water, specifically the water in the center of the jet, deflects off the first surface and passes through the center slot without being deflected by the outwardly directed second surfaces, allowing it to pass further out from the sprinkler than the water deflected by the second surfaces.

In accordance with another feature of the present invention, a water deflector whether it is constructed of plastic or other suitable material, for example brass, is provided and includes a hollow support bearing having an internal, longitudinally extending, cylindrical surface positioned around the outer cylindrical surface of the support pin in close fitting but slidable relationship such that the deflector is pivotable about the pin. One of these cylindrical surfaces, preferably the inner surface of the support bearing, includes therein a slotted passage extending its entire length in confronting relationship with the other surface, preferably the outer surface of the support pin. In this manner, should abrasive material be lodged between the support pin and bearing surface of the deflector, as the deflector pivots, the abrasive material will work its way into the slotted passage and eventually work its way up or down the passage and out of the sprinkler without causing undue wear and/or malfunction to the sprinkler.

A BRIEF DESCRIPTION OF THE DRAWING

FIG. 1 is a side elevational view of an impact sprinkler constructed in accordance with the present invention.

FIG. 2 is a side elevational view of a segment of a water deflector comprising part of the sprinkler of FIG. 1, specifically the water deflecting segment of the deflector.

FIG. 3 is a sectional view taken generally along long 3—3 in FIG. 2.

FIG. 4 is a sectional view of the bearing segment of a water deflector comprising part of the sprinkler of FIG. 1.

FIG. 5 is a sectional view taken generally along line 5—5 in FIG. 4.

DETAILED DESCRIPTION

Turning to the drawing, wherein like components are designated by like reference numerals throughout the various figures, attention is specifically directed to FIG. 1 which shows an impact sprinkler 10 constructed in accordance with the present invention. Sprinkler 10 includes a conventional sprinkler body 12 conventionally mounted for rotation within a journal assembly 14, which, in turn, is adapted for mounting to a vertical riser (now shown) to connect the sprinkler to a supply line (also not shown). The sprinkler body includes an upwardly and outwardly directed nozzle arm 16 supporting at its free end a nozzle tip 18.

Sprinkler body 12 also includes as conventional components a longitudinally extending, cylindrical journal pin 20 positioned behind nozzle 18 and a frame 22 surrounding the journal pin. As will be seen below, impact sprinkler 10 additionally includes a water deflector 24 which is mounted for pivotal movement about journal pin 20 and which is constructed in accordance with the present invention. Water deflector 24 may be separated into three segments, a rearwardmost counter-balancing segment 26, a forwardmost water deflecting segment 28, commonly referred to as a deflector spoon, and a central bearing segment 30 mounted around journal pin 20 such that the entire deflector 24 is pivotally movable about the journal pin.

The exact manner in which deflector 24 oscillates or pivots back and forth about pin 20 to produce the impact operation of the sprinkler is well known in the art and will not be described in detail here. It should suffice to state that as the deflector 24, which extends through frame 22, pivots or oscillates back and forth, water deflecting segment 28 moves into and out of the path defined by the water jet issuing from nozzle 18. The deflector is urged in one direction by a spring 32 and is urged in the opposite direction by the inner action of the water jet striking the water deflecting segment.

Turning to FIGS. 2 and 3, attention is directed to water deflecting segment 28 which, as will be seen hereinafter, is designed to improve the water distribution pattern of sprinkler 10, particularly when the overall water deflector is constructed of relatively lightweight plastic, as compared to much heavier weight brass. Water deflecting segment 28 is somewhat rectangular in general configuration and is defined by a back end 34, a front end 36 and side walls 38 extending from back end 34 to front end 36 in a direction away from nozzle 18. Water deflecting segment 28 includes four water deflecting sub-segments, sub-segment 40, sub-segment 42 and sub-segments 44*a* and 44*b*.

Sub-segment 40, best illustrated in FIG. 3, includes three water deflecting surfaces designated by the reference numerals 46, 48 and 50, respectively. Surface 46 is a conventional flat surface extending from a point near the back end 34 of the deflector forwardly towards the front end thereof at approximately a 10° angle with the axis of nozzle 18, i.e., with the center line of the jet of water coming from the nozzle, when side walls 38 are in a position parallel to the center line of the water jet. Surface 48 which is also a conventional surface, extends rearwardly from the back end of surface 46 at an angle of between approximately 30° and 35° with the center line of the water jet, again when the side walls are parallel to the water jet center line. Surface 50, which is not conventional, is located at the rearwardmost end of the surface 48 and to one side thereof, as illustrated in FIG. 3, and is disposed at approximately a 90° angle with respect to the center line of the water jet when the side walls are parallel thereto. In other words surface 56 is disposed at a 90° angle with respect to the side walls.

As water deflecting segment 28 moves into the path defined by the water jet issuing from nozzle 18, water is deflected off of the three surfaces just discussed. Water impinging on surface 46 is deflected towards sub-segment 42 as will be discussed below. Water impinging on surface 48 is deflected out at an angle of approximately 35° with the center line of the jet providing water at approximately the center of the overall water distribution pattern. Water impinging on the 90° surface 50 is deflected a short distance from the sprinkler and therefore contributes to the close-in section of the overall pattern.

Sub-segment 42, which is positioned in front of sub-segment 40 includes one main water deflecting surface 52. This surface extends from its rearward end 56, i.e. its end closest to sub-segment 40 and therefore nozzle 18, towards a forward end 58 at an angle of approximately 10° with the center line of the water jet, but on the opposite side of the jet then surface 46, when side walls 38 are parallel to the water jet. In this regard, the opposite sides of surface 52 extending from end 56 to end 58 are bounded by side walls 38. Note that surface 52 can extend further out from end 58 between sub-segments 44*a* and 44*b* as indicated at 55.

Each of the sub-segments 44*a* and 44*b* includes a water deflecting surface 54*a* and 54*b* respectively which extends upwardly and outwardly from the end 58 of surface 52 at an angle with the surface, preferably at approximately 60° with the center line of the jet stream when side walls 38 are parallel therewith. In accordance with the present invention, surfaces 54*a* and 54*b* extend towards one another from side walls 38, i.e. from the sides of surface 52 but are spaced from one another so as to define a slot 57 therebetween. As illustrated best in FIG. 2, slot 57 is centrally located between side walls 38, i.e. between the sides of surface 52 and, hence, is located approximately in the center of the jet stream of water issuing from nozzle 18 when side walls 38 are parallel with and located on opposite sides of the center of the jet stream.

In operation, as water impinges on surface 52, either directly from nozzle 18 or water deflected from surface 46, or a portion thereof, that water located near the sides of surface 52, pass up surfaces 54*a* and 54*b* where it is directed approximately midway in the overall water distribution pattern. In accordance with the present invention, the water impinging approximately centrally on surface 52 passes out through slot 57 at approximately a 10° angle with the jet stream, as opposed to the 60° angle of surfaces 54*a* and 54*b*. Therefore, this water passing through the slot passes substantially further out than the water deflected off the surfaces 54*a* and 54*b* and, in fact, contributes in part to the outlying portion of the water distribution pattern.

If slot 57 did not exist, that is, if surfaces 54*a* and 54*b* merged into one another to form a single 60° surface extending across surface 52, the overall water distribution pattern from sprinkler 10 would not be satisfactorily uniform. Specifically, while the outermost edges of the pattern would be provided by undeflected water from nozzle 18 there would be a large gap between these outermost points and water attributed to that deflected off of surfaces 54*a* and 54*b* which is approximately centrally located in the overall pattern. In addition, with plastic deflectors there would be less undeflected water than with brass, as explained previously. With slot 57 water is placed nearer to the outer periphery, hence making the overall pattern more uniform.

The slot 57 is centrally located, as illustrated in FIG. 2, for several reasons. First, by centrally locating the slot, the water passing therethrough is centrally located within the jet stream and, hence, will be thrown a further distance than if the slot were positioned to one side allowing water from the side of the jet stream to pass therethrough. This is because water at the center of the jet stream, i.e., water being delivered through the center of nozzle 18 tends to go further than the water comprising the sides of the jet. Second, if the slot were positioned to one side of the jet stream, specifically adjacent one or both of the side walls, too much water would be thrown out to a given area, i.e., near the outer periphery of the pattern, since much of the water impinging on the sides of surface 52 tends to accumulate with water deflecting off of the side walls 38 producing more water than is desired.

Having described water deflecting segment 28 attention is now directed to bearing segment 30 of deflector 10 as illustrated in FIGS. 4 and 5. As shown in these Figures, segment 30 is cylindrical in shape having an opened top end 60, an opened bottom end 62 and a cylindrical, longitudinally extending, internal bearing surface 64. With water deflector 10 in its operating position, i.e., the position shown in FIG. 1, bearing surface 64 is positioned around and in confronting relationship with the outer cylindrical surface of pin 20. The relative positioning of these two surfaces is best seen in FIG. 5, pin 20 being indicated by dotted lines. Note that these two surfaces are in close fitting but slidable relationship with one another so that bearing segment 30 can pivot about pin 10.

In accordance with another feature of the present invention, a plurality of slotted passages 66 are provided in surface 64 and extend axially along the surface from top end 60 to bottom end 62 of bearing segment 30. With the bearing segment position in its operating position around pin 20, these slots confront the outer surface of the pin. As the deflector pivots back and forth about pin 20 debris, for example, abrasive material, lodged between surface 64 of the bearing segment and the outer surface of the pin will eventually work into slotted passages 66 and eventually entirely out of the bearing segment. In this way, wear and/or possible malfunction is minimized.

Bearing segment 30 was described as including a plurality of slotted passages 66, specifically two. It is to be understood that more than two passages could be provided in accordance with the present invention. While not as effective, surface 64 of segment 30 could include a single slotted passage. In addition, it is possible to provide similar slotted passages in the external surface of pin 20 in addition to or in lieu of slotted passages 66 so as to achieve the same end results.

What I claim is:

1. An impact-type sprinkler, comprising:

a. a main body including i. a nozzle, and ii. a cylindrical water deflector support pin positioned above and to one side of said nozzle;

b. a plastic water deflector including a water deflecting segment, said deflector being mounted for pivotal movement about said support pin such that said water deflecting segment moves into and out of a jet of water issuing from said nozzle as said deflector pivots about said pin; and c. said water deflecting segment including i. a first substantially flat water deflecting surface extending away from said nozzle for receiving water issuing from said jet and deflecting said water further away from said nozzle, said surface including opposite ends, one end of which is further from said nozzle than the other end and opposite sides extending between said opposite ends, ii. opposite side walls extending the length of said water deflecting segment and respectively extending out from said opposite sides of said first surface for defining the lateral extent of said first surface, and iii. a pair of second water deflecting surfaces extending out from and joining said further end of said first surface for receiving and deflecting some but not all of the water deflected from said first surface, said second surfaces extending towards each other from said opposite side walls and facing back towards the end of said first surface closer to said nozzle but being spaced from another so as to define a slot therebetween, said slot being approximately centrally located between the side walls so that the water which is deflected from said first surface approximately centrally between said side walls passes through said slot without being deflected by said second surfaces.

2. An impact-type sprinkler according to claim 1 wherein said first surface extends into said slot and between said second surfaces.

3. An impact-type sprinkler according to claim 1 wherein said deflecting segment includes a third water deflecting surface located between said nozzle and said first surface.

4. An impact-type sprinkler according to claim 1 wherein said deflector includes a cylindrical bearing surface positioned around the outer cylindrical surface of said support pin in a closely but slidably fitting manner, one of said last-mentioned cylindrical surfaces including therein a slotted passage extending its entire length and in confronting relationship with the other of said last-mentioned cylindrical surfaces.

5. An impact-type sprinkler according to claim 4 wherein said slotted passage is located in said cylindrical bearing surface of said deflector.

6. An impact-type sprinkler according to claim 5 wherein said cylindrical bearing surface includes a plurality of said slotted passages.

* * * * *